United States Patent
Kim et al.

(10) Patent No.: US 9,917,518 B2
(45) Date of Patent: Mar. 13, 2018

(54) METHOD AND CIRCUIT OF DETECTING ATTACHMENT AND DETACHMENT BETWEEN A PORTABLE DEVICE AND A POWER CONVERTER

(71) Applicant: SEMICONDUCTOR COMPONENTS INDUSTRIES, LLC, Phoenix, AZ (US)

(72) Inventors: Eui-Soo Kim, New Taipei (TW); Bong-Geun Chung, Gyeonggi-do (KR); Gwan-Bon Koo, Gyeonggi-do (KR); Ju-Hyun Kim, Kyounggi-do (KR); Young-Bae Park, Taipei (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 300 days.

(21) Appl. No.: 14/692,998

(22) Filed: Apr. 22, 2015

(65) Prior Publication Data

US 2015/0311806 A1 Oct. 29, 2015

Related U.S. Application Data

(60) Provisional application No. 61/983,767, filed on Apr. 24, 2014.

(51) Int. Cl.
*H02J 7/00* (2006.01)
*H02M 3/335* (2006.01)
*H02M 1/00* (2006.01)

(52) U.S. Cl.
CPC ....... *H02M 3/33507* (2013.01); *H02J 7/0004* (2013.01); *H02J 7/0021* (2013.01); *H02M 3/33523* (2013.01); *H02J 2007/0062* (2013.01); *H02M 2001/0032* (2013.01); *Y02B 70/16* (2013.01)

(58) Field of Classification Search
CPC . G06F 1/266; H02J 2007/0062; H02J 7/0004; H02J 7/0021; H02M 3/33507; H02M 3/33523; H02M 2001/0033; Y02B 70/16
See application file for complete search history.

(56) References Cited

U.S. PATENT DOCUMENTS

| | | | |
|---|---|---|---|
| 5,896,346 A | 4/1999 | Dell et al. | |
| 2012/0043927 A1 | 2/2012 | Park et al. | |
| 2013/0286701 A1* | 10/2013 | Im | H02J 9/005 363/126 |
| 2014/0220825 A1 | 8/2014 | Chang | |

FOREIGN PATENT DOCUMENTS

| | | |
|---|---|---|
| CN | 203119536 U | 8/2013 |
| TW | 466416 B | 12/2001 |
| TW | M458687 U | 8/2013 |

* cited by examiner

*Primary Examiner* — Ernest Unelus
(74) *Attorney, Agent, or Firm* — Robert F. Hightower

(57) ABSTRACT

A method and a circuit of detecting attachment and detachment between a portable device and a power converter are provided. The method and the circuit confirm attachment of the portable device to the power converter and generate an attachment signal. The method and the circuit further detect a bus voltage of the power converter for confirming detachment of the portable device from the power converter.

19 Claims, 7 Drawing Sheets

METHOD AND CIRCUIT OF DETECTING ATTACHMENT AND DETACHMENT BETWEEN A PORTABLE DEVICE AND A POWER CONVERTER

REFERENCES TO RELATED APPLICATIONS

This application is based on Provisional Application Ser. No. 61/983,767, filed 24 Apr. 2014, currently pending.

BACKGROUND OF THE INVENTION

Field of Invention

The present invention relates to a power converter, and more specifically relates to a method and a circuit for detecting attachment of the portable device to the power converter and detachment of the portable device from the power converter.

Description of the Related Art

In the past few years, portable devices (PD) are becoming a necessity to people's lives. Power converters (chargers) designed for those devices usually come with them in the same sales package provided by the manufacturer. This guarantees those portable devices to be always powered under their regulated power-supply specifications.

In recent developments, more and more chargers using USB (Universal Series Bus) cables to connect with their target portable devices are replacing traditional twisted-pair-cable chargers. In addition to those two twisted wires which function the same as the traditional chargers to serve as power supply and ground, there are two additional data lines in USB cables to define the types of charging devices such as SDP (Standard Downstream Port), CDP (Charging Downstream Port) and DCP (Dedicated Charging Port). These two data lines, recently, have been used for communication between the portable devices and the chargers, for example, to adaptively change the power supply level of the chargers by the requests from the portable devices.

The U.S. Patent Application Publication No. 2010/0052620 A1 provides a battery charger IC including built-in USB detection, as shown in FIG. 1A and FIG. 1B. It determines whether the input voltage source comprises the USB voltage or the non-USB voltage using the data pins. Nevertheless, it can't confirm the detachment of the portable device from the charger. Therefore, a method and a circuit for detecting detachment of the portable device from the charger is desired by the industries.

BRIEF SUMMARY OF THE INVENTION

The objective of the present invention is to provide a circuit and a method for detecting attachment of a portable device (PD) to a power converter (charger) and detecting detachment of the portable device from the power converter (charger).

The present invention proposes a circuit for detecting attachment and detachment between a portable device (PD) and a power converter comprises: a PD attachment detection circuit and a PD detachment detection circuit. The PD attachment detection circuit is coupled to at least one connecting terminal of the power converter for confirming attachment of the portable device to the power converter and generating an attachment signal. The PD detachment detection circuit detects a bus voltage of the power converter according to an enabling signal. The enabling signal is generated when the power converter enters a light-load condition. The PD detachment detection circuit confirms detachment of the portable device from the power converter by detecting a voltage drop of the bus voltage of the power converter. The at least one connecting terminal of the power converter can be a data terminal or a current-sense terminal. The circuit further comprises a load detection circuit to detect the light-load condition of the power converter in response to the attachment signal, and generate the enabling signal.

The attachment of the portable device to the power converter can be confirmed by the PD attachment detection circuit when an increase of the voltage at the data terminal is detected by the PD attachment detection circuit. The attachment of the portable device to the power converter can also be confirmed by recognizing a pattern current generated by the portable device. The load detection circuit detects a voltage of a transformer of the power converter for detecting the light-load condition of the power converter and generating the enabling signal. The circuit further comprises a gate driver to control a BUS switch which is coupled between an output capacitor and a bus capacitor of the power converter for generating the bus voltage across the bus capacitor.

The PD detachment detection circuit controls the gate driver to turn off the BUS switch in response to the enabling signal. The PD detachment detection circuit memorizes the bus voltage before turning off the BUS switch and monitors the voltage drop of the bus voltage after turning off the BUS switch for confirming the detachment of the portable device from the power converter. The PD detachment detection circuit controls the gate driver to turn off the BUS switch when the enabling signal indicates the light-load condition of the power converter.

The present invention also proposes a method of detecting attachment and detachment between a portable device (PD) and a power converter. The method comprises: confirming attachment of the portable device to the power converter and generating an attachment signal; and detecting a bus voltage of the power converter in response to an enabling signal. The enabling signal is generated when the power converter enters a light-load condition. Detachment of the portable device from the power converter is confirmed by detecting a voltage drop of the bus voltage of the power converter. The attachment signal can be generated by detecting a voltage at a data terminal of the power converter. The attachment signal can also be generated by recognizing a pattern current at a current-sense terminal of the power converter. The pattern current is generated by the portable device. Attachment of the portable device to the power converter is confirmed when an increase of the voltage at the data terminal is detected.

The method also comprises detecting a voltage of a transformer of the power converter in response to the attachment signal for detecting the light-load condition of the power converter and generating the enabling signal. The method also comprises controlling a BUS switch which is coupled between an output capacitor and a bus capacitor of the power converter for generating the bus voltage across the bus capacitor. The method further comprises memorizing the bus voltage before turning off the BUS switch; and monitoring the voltage drop of the bus voltage after turning off the BUS switch for confirming the detachment of the portable device from the power converter. The BUS switch is turned off when the enabling signal indicates the light-load condition of the power converter.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1A:
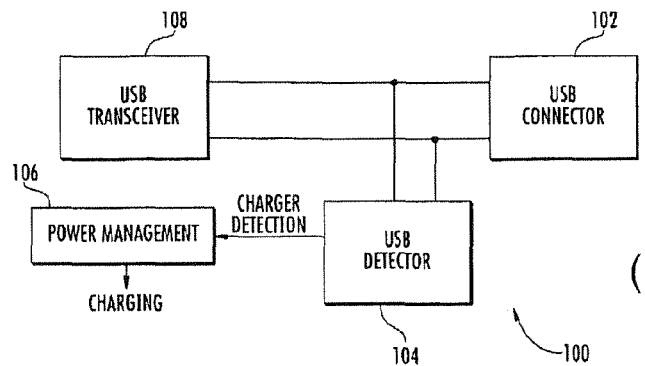
FIG. 1A is a block diagram of the prior art USB detection system.
Figure 1B:
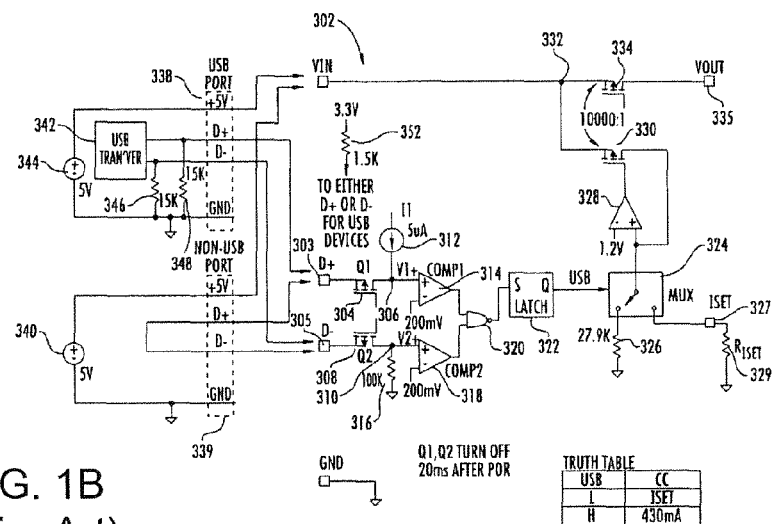
FIG. 1B is a schematic diagram of the prior art USB detection circuit.
Figure 2:
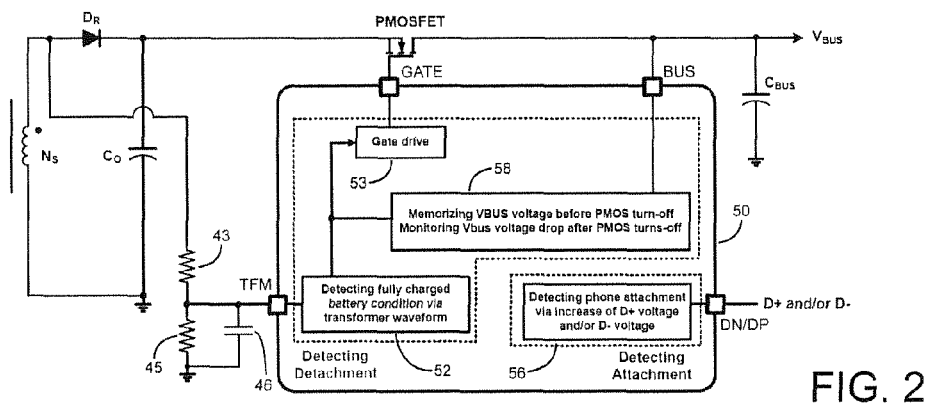
FIG. 2 is a block diagram of an embodiment of a detection circuit according to the present invention.
Figure 3A:
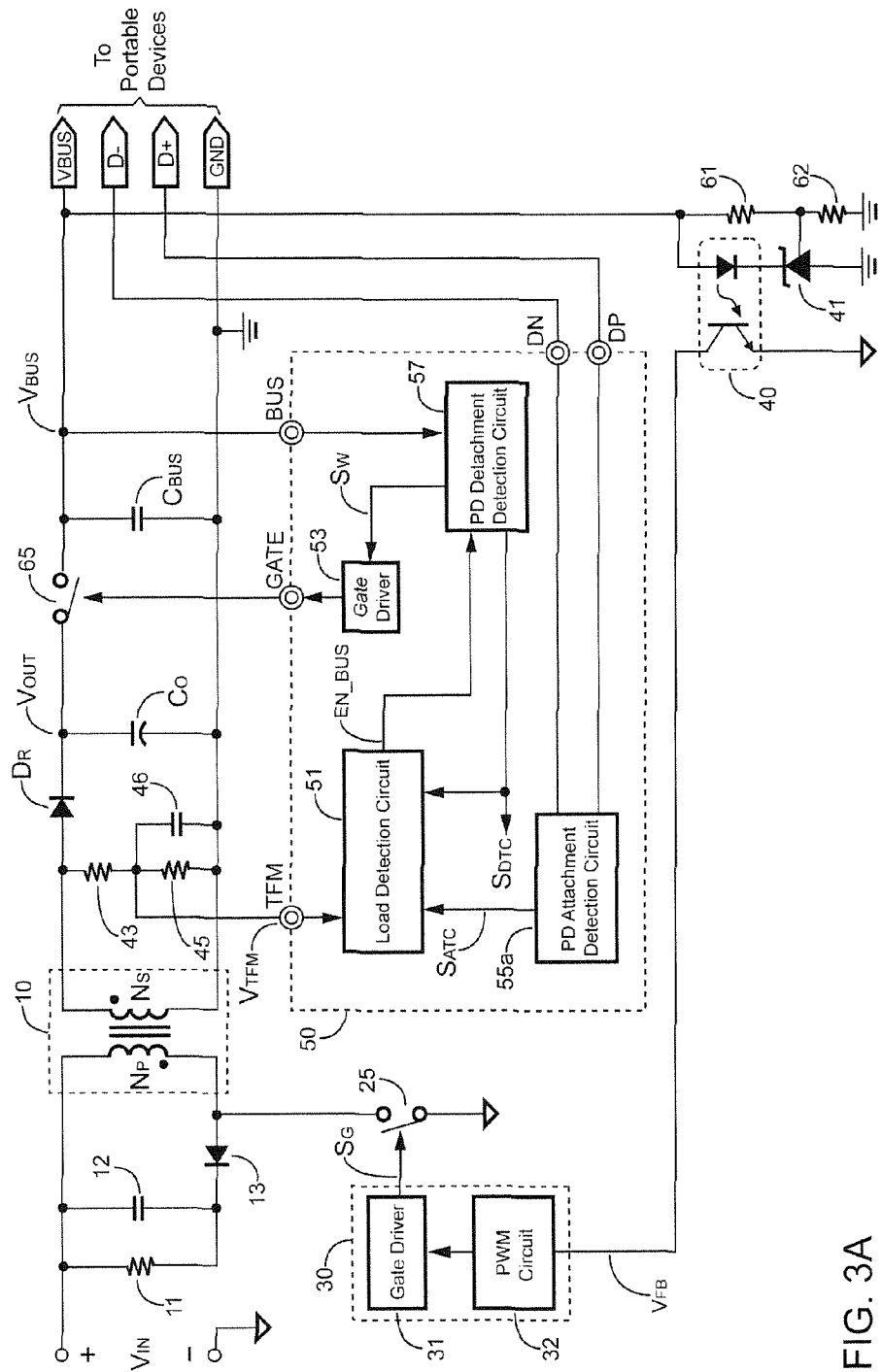
FIG. 3A is a schematic diagram of an embodiment of a power converter with the detection circuit according to the present invention.

Referring to FIG. 2 and FIG. 3A, FIG. 2 is a block diagram of an embodiment of a detection circuit according to the present invention, and FIG. 3A is a schematic diagram of an embodiment of a power converter with the detection circuit according to the present invention. As shown in FIG. 2 and FIG. 3A, the detection circuit 50 is coupled to the secondary side of the power converter which serves as a charger to provide the power to a portable device (PD) attached to the power converter for charging the battery of the portable device. The detection circuit 50 is utilized to detect the attachment of the portable device to the power converter and the detachment of the portable device from the power converter. More detailed circuit of the detection circuit 50 will be described later.

The power converter comprises a transformer 10 having a primary winding $N_P$ and a secondary winding $N_S$ for transferring the power from the primary winding $N_P$ to the secondary winding $N_S$. A first terminal of the primary winding $N_P$ of the transformer 10 is coupled to receive an input voltage $V_{IN}$ of the power converter. A switch 25 is coupled between a second terminal of the primary winding $N_P$ of the transformer 10 and a ground. The switch 25 is coupled to switch the transformer 10 for transferring the power.

As FIG. 3A shows, a resistor 11, a capacitor 12, and a diode 13 are coupled to the primary winding $N_P$. A rectifier $D_R$, an output capacitor $C_O$, a BUS switch 65, and a bus capacitor $C_{BUS}$ are coupled to the secondary winding $N_S$. The secondary winding $N_S$ generates an output voltage $V_{OUT}$ across the output capacitor $C_O$ via the rectifier $D_R$ for generating a bus voltage $V_{BUS}$ across the bus capacitor $C_{BUS}$ through the BUS switch 65. Once the transformer 10 is switched, the power is transferred from the primary winding $N_P$ to the secondary winding $N_S$, and the bus voltage $V_{BUS}$ is therefore generated. According to one embodiment of the present invention, the output capacitor $C_O$ is a bulk capacitor, for example Electrolytic capacitor, the capacitance of the output capacitor $C_O$ is much larger than the capacitance of the bus capacitor $C_{BUS}$, and the BUS switch 65 coupled between the output capacitor $C_O$ and the bus capacitor $C_{BUS}$ can be a P-type MOSFET.

A switching controller 30 is coupled to control the switch 25 for switching the transformer 10. The switching controller 30 comprises a gate driver 31 and a PWM (Pulse Width Modulation) circuit 32. The PWM circuit 32 generates a PWM signal in response to a feedback signal $V_{FB}$ correlated to the load condition of the power converter. The gate driver 31 is coupled to receive the PWM signal from the PWM circuit 32 to generate a main switching signal $S_G$. The main switching signal $S_G$ drives the switch 25 for regulating the output voltage $V_{OUT}$ and the bus voltage $V_{BUS}$.

The power converter has four connecting terminals which are a bus power terminal VBUS, data terminals $D_+$ and $D_-$, and a ground terminal GND. The terminals VBUS and GND are respectively coupled to two terminals of the secondary winding $N_S$. The BUS switch 65 and the bus capacitor $C_{BUS}$ are coupled to the bus power terminal VBUS. The portable device also has four connecting terminals VBUS, $D_+$, $D_-$, and GND to coupled to the power converter via a cable (not shown), such as an USB cable having four lines (a bus power line, two data lines, and a ground line) connecting the four connecting terminals of the power converter and the four connecting terminals of the portable device. The power converter supplies the power to the portable device at the bus power terminal VBUS and the ground terminal GND via the bus power line and the ground line of the cable, respectively. The portable device transmits the instructions/signals to the power converter via the data terminals $D_+$ and $D_-$.

The power converter further comprises a feedback circuit comprising an optical-coupler 40, a shunt regulator 41, and a voltage divider including resistors 61 and 62 for generating the feedback signal $V_{FB}$. The voltage divider is coupled between the bus power terminal VBUS and the ground terminal GND to divide the bus voltage $V_{BUS}$. The optical-coupler 40 is coupled between the bus power terminal VBUS and the PWM circuit 32 to generate the feedback signal $V_{FB}$. The optical-coupler 40 is further coupled to the ground terminal GND via the shunt regulator 41 coupled to the voltage divider to receive the divided voltage.

Furthermore, a voltage divider including resistors 43 and 45 is coupled between the two terminals of the secondary winding $N_S$ to divide a voltage across the secondary winding $N_S$ of the transformer 10. The divided voltage generated by the resistors 43 and 45 charges a capacitor 46 coupled to the resistors 43 and 45 for generating a voltage $V_{TFM}$ across the capacitor 46. The voltage $V_{TFM}$ represents the transformer voltage of the secondary winding $N_S$. Therefore, the load condition of the power converter can be observed from the switching waveform of the voltage $V_{TFM}$.

Figure 4:
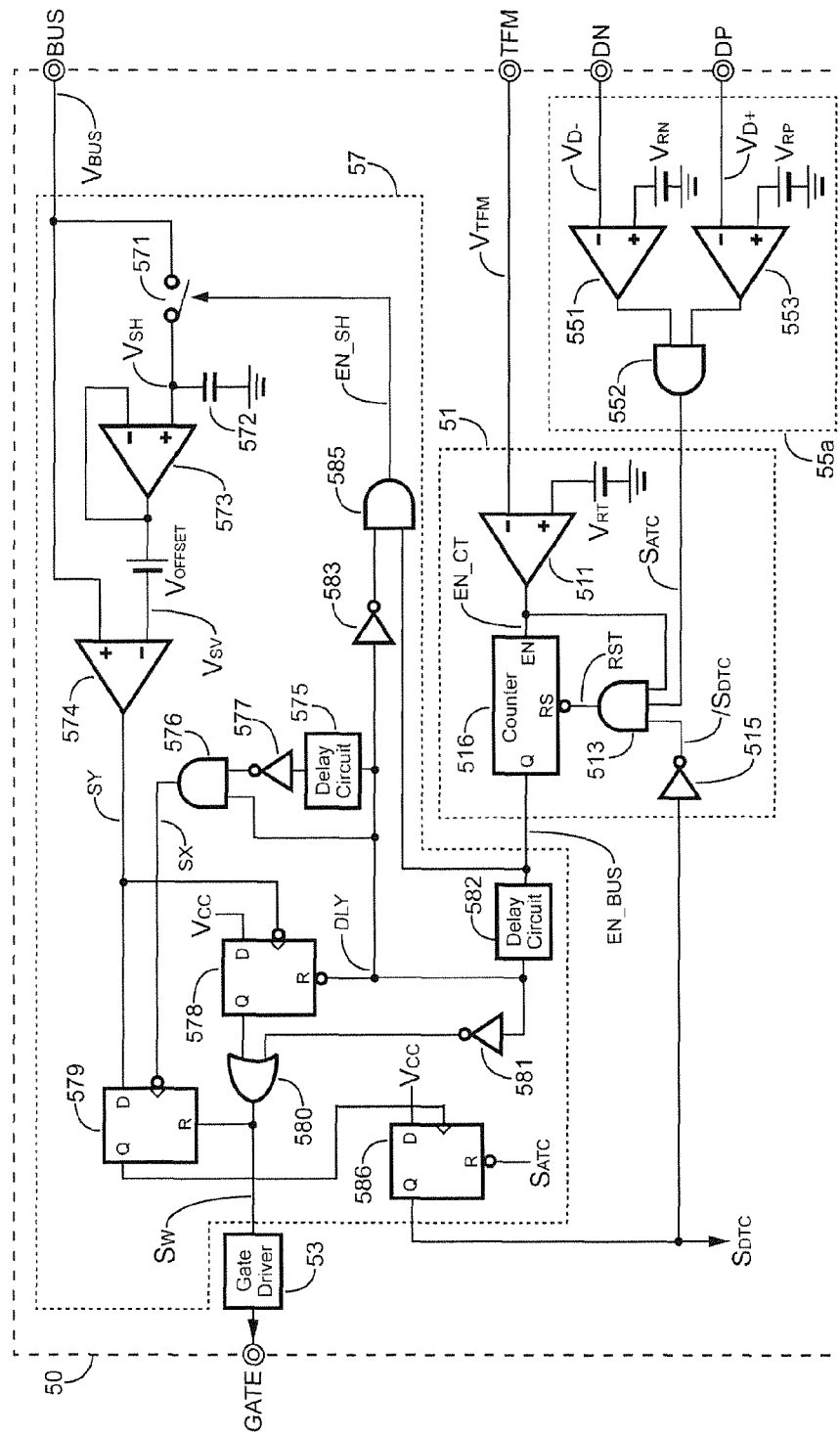
FIG. 4 is a schematic diagram of an embodiment of the detection circuit according to the present invention.

The detection circuit 50 has five terminals which are a transformer voltage terminal TFM, a gate terminal GATE, a bus voltage terminal BUS, and input terminals DN and DP. The detection circuit 50 further comprises a load detection circuit 51, a gate driver 53, a PD attachment detection circuit 55a, and a PD detachment detection circuit 57. The input terminals DP and DN are respectively coupled to the data terminals $D_+$ and D−. In an embodiment of the present invention, the attachment detection circuit 55a is coupled to the data terminals D− and $D_+$ to detect a voltage $V_{D-}$ (as shown in FIG. 4) at the data terminal D− and a voltage $V_{D+}$ (as shown in FIG. 4) at the data terminals $D_+$ via the input terminals DN and DP for confirming the attachment of the portable device to the power converter.

As shown in block 56 of the FIG. 2, the PD attachment detection circuit 55a detects attachment of the portable device, for example mobile phone, to the power converter by detecting the increment of the voltage $V_{D-}$ and/or the voltage $V_{D+}$ during the duration of PD charging. The PD attachment detection circuit 55a will generate an attachment signal $S_{ATC}$ according to the detecting result. According to another embodiment of the present invention, the PD attachment detection circuit 55a is only coupled to the input terminal DN or DP to receive the voltage $V_{D-}$ or the voltage $V_{D+}$ for detecting the PD attachment.

The load detection circuit 51 is coupled to the transformer voltage terminal TFM to detect the voltage $V_{TFM}$ for detecting the load condition of the power converter and generating an enabling signal EN_BUS. Once the battery of the portable device is fully charged, the load at the bus power terminal VBUS will become a light-load condition. Accordingly, the load detection circuit 51 confirms whether the battery of the portable device is fully charged or not. As shown in block 52 of the FIG. 2, the load detection circuit 51 detects the fully charged battery condition by detecting the transformer voltage of the transformer 10. Even though it is not fully charged battery condition, the load detection circuit 51 can also detect other small output load condition via various operation mode of the portable device. The load detection circuit 51 is further coupled to the PD attachment detection circuit 55a and the PD detachment detection circuit 57 to receive the attachment signal $S_{ATC}$ and a detachment signal $S_{DTC}$ generated by the PD detachment detection circuit 57.

Figure 3B:
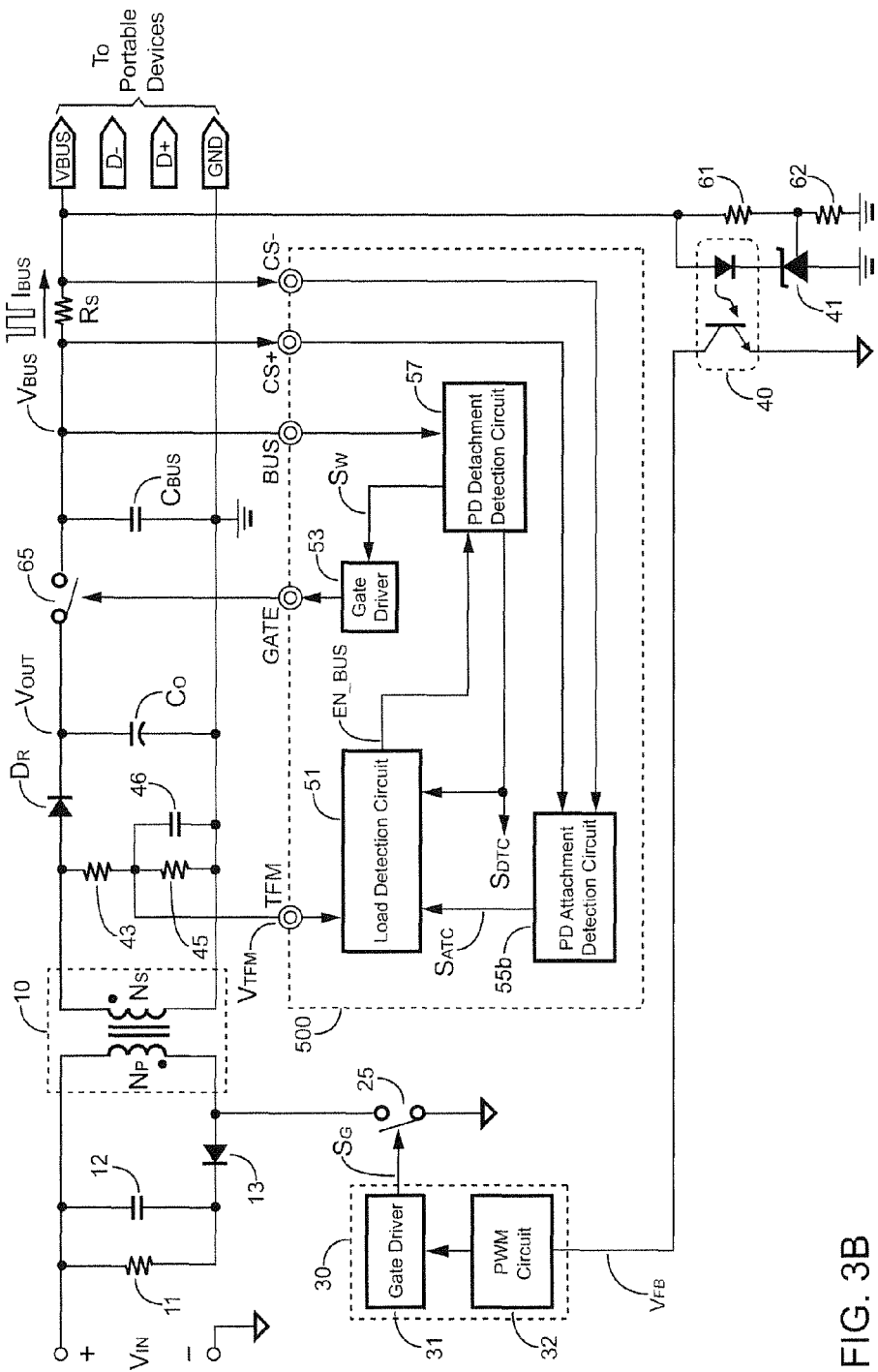
FIG. 3B is a schematic diagram of another embodiment of the power converter with the detection circuit according to the present invention.

FIG. 3B is another embodiment of the present invention. A detection circuit 500 has five connecting terminals which are a transformer voltage terminal TFM, a gate terminal GATE, a bus voltage terminal BUS, and current-sense terminals CS+ and CS−. An PD attachment detection circuit 55b is coupled to sense terminals CS+ and CS−. The current-sense terminals CS+ and CS− are connected to two terminals of a current-sense resistor $R_S$ which is connected between the bus capacitor $C_{BUS}$ and the bus power terminal VBUS. The terminals CS+ and CS− sense a pattern current $I_{BUS}$ drawn by the portable device flowing through the bus power terminal VBUS. In one embodiment, the pattern current $I_{BUS}$ can be a serial current waveform with short pulse width from the portable device. In another embodiment, the pattern current $I_{BUS}$ can be in any waveform that can be recognized by the PD attachment detection circuit 55b. Once the PD attachment detection circuit 55b successfully recognizes the submitted pattern current $I_{BUS}$, the attachment of the portable device to the power converter can be therefore confirmed.

The PD detachment detection circuit 57 is coupled to the bus voltage terminal BUS. In response to the enabling signal EN_BUS and after turning off the BUS switch 65, the PD detachment detection circuit 57 detects the bus voltage $V_{BUS}$. Once the portable device is detached from the power converter, there will be no load at the bus power terminal VBUS. The load condition of the power converter will become no-load condition and the voltage drop, which is caused by the ESR (Equivalent Series Resistance) or the leakage current of the bus capacitor $C_{BUS}$, of the bus voltage $V_{BUS}$ will be insignificant. In addition, once the portable device consumes very small power, such as fully charged condition and not detached from the power converter, the load condition of the power converter will be light-load condition. Compared to the no-load condition in which the portable device is detached from the power converter, the voltage drop of the bus voltage $V_{BUS}$ will be obvious when the portable device is still being attached to the power converter because the load condition caused by the portable device, even light-load condition, will consume the energy held across the small-capacitance bus capacitor $C_{BUS}$ shortly.

Accordingly, the PD detachment detection circuit 57 confirms that the detachment of the portable device from the power converter by detecting the bus voltage $V_{BUS}$ when the PD detachment detection circuit 57 receives the enabling signal EN_BUS from the load detection circuit 51. This indicates the light-load condition (the portable device is fully charged). The PD detachment detection circuit 57 further generates the detachment signal $S_{DTC}$ and a switching signal $S_W$. The detachment signal $S_{DTC}$ indicates whether the portable device is detached from the power converter or not. The switching signal $S_W$ turns off the BUS switch 65 whenever the bus voltage $V_{BUS}$ is to be detected. As shown in block 58 of the FIG. 2, the PD detachment detection circuit 57 memorizes the bus voltage $V_{BUS}$ before the BUS switch 65 (P-type MOSFET shown in FIG. 2) is turned off, and then the PD detachment detection circuit 57 monitors the voltage drop of the bus voltage $V_{BUS}$ after turning off the BUS switch 65 for confirming the detachment of the portable device from the power converter.

FIG. 4 is a schematic diagram of an embodiment of the detection circuit 50 according to the present invention. As shown in FIG. 4, the PD attachment detection circuit 55a comprises comparators 551, 553, and an AND gate 552. The negative input terminal of the comparator 551 is coupled to the input terminal DN to receive the voltage $V_{D-}$, and the positive input terminal of the comparator 551 is supplied with a reference signal $V_{RN}$. The negative input terminal of the comparator 553 is coupled to the input terminal DP to receive the voltage $V_{D+}$, and the positive input terminal of the comparator 553 is supplied with a reference signal $V_{RP}$. The output terminals of the comparators 551 and 553 are coupled to the input terminals of the AND gate 552. The output terminal of the AND gate 552 generates the attachment signal $S_{ATC}$.

Figure 5:
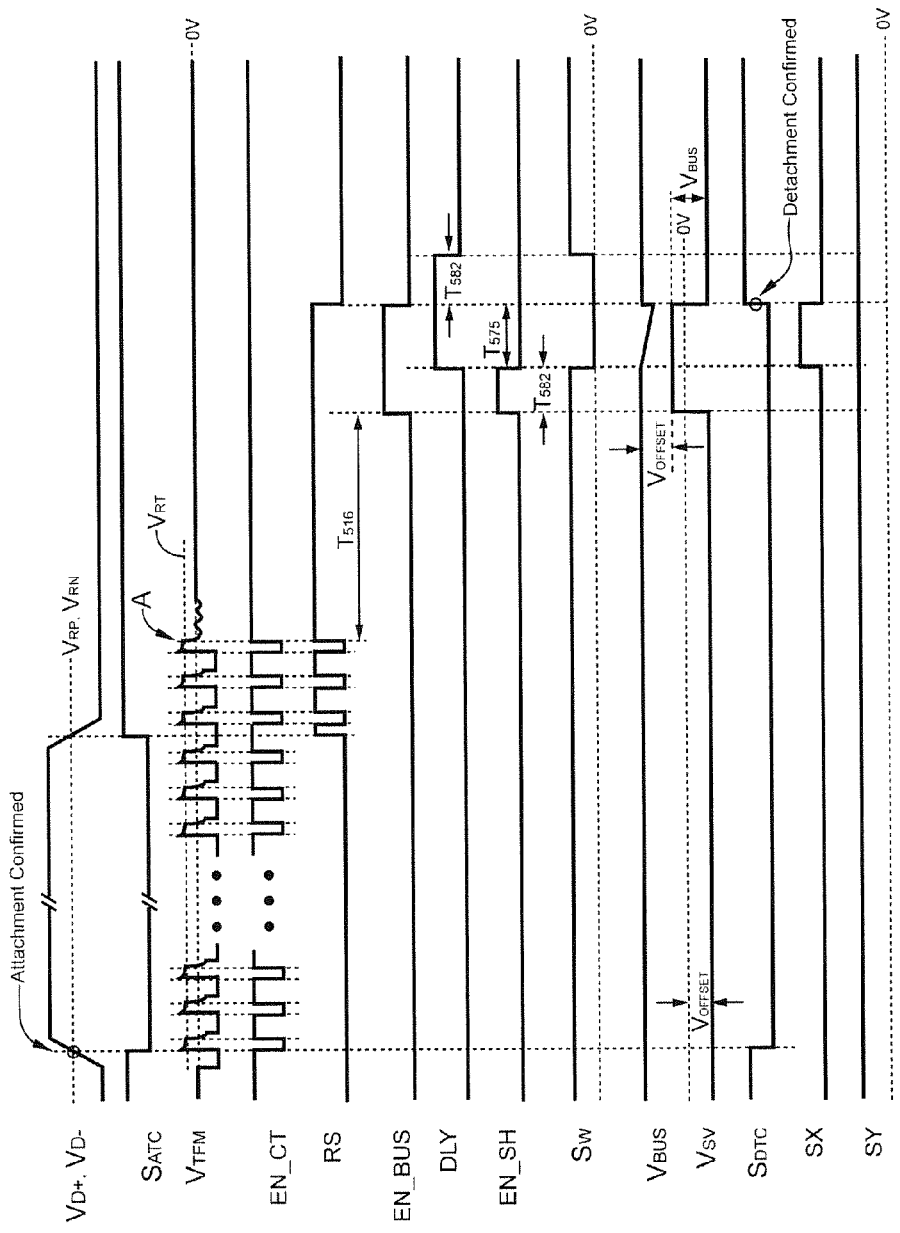
FIG. 5 is a timing diagram illustrating that the detachment of the portable device from the power converter is confirmed according to the present invention.

In order to satisfy Battery Charging Specification, BC1.2, the voltage $V_{D-}$ and/or voltage $V_{D+}$ are/is higher than a reference voltage, at least one time when the portable device is attached to the charger. Therefore, once the level of the voltage $V_{D-}$ is higher than the level of the reference signal $V_{RN}$ or/and the level of the voltage $V_{D+}$ is higher than the level of the reference signal $V_{RP}$, the level of the comparison output signal at the output terminals of the comparator 551 or/and 553 will become logic low, and therefore the level of the attachment signal $S_{ATC}$ will also become logic low, as shown in FIG. 5. That is, the attachment of the portable device to the power converter is confirmed by the PD attachment detection circuit 55a when the increase of the voltage $V_{D+}$ or $V_{D-}$ is detected by the PD attachment detection circuit 55a. According to another embodiment of the present invention, the PD attachment detection circuit 55a only comprises the comparator 551 or 553 for detecting the PD attachment.

The load detection circuit 51 comprises a comparator 511, an AND gate 513, an inverter 515, and a counter 516. The negative input terminal of the comparator 511 is coupled to the transformer voltage terminal TFM to receive the voltage $V_{TFM}$ representing the transformer voltage of the transformer 10 (as shown in FIG. 3A). The positive input terminal of the comparator 511 is supplied with a reference signal $V_{RT}$. The output terminal of the comparator 511 generates an enabling signal EN_CT supplied to the enable terminal EN of the counter 516. Once the level of the voltage $V_{TFM}$ is lower than the level of the reference signal $V_{RT}$, the level of the enabling signal EN_CT will become logic high (enabled), as shown in FIG. 5, to enable the counter 516 to start counting a counted time $T_{516}$, as shown in FIG. 5.

The AND gate 513 is coupled to the output terminals of the AND gate 552 and the comparator 511 to receive the attachment signal $S_{ATC}$ and the enabling signal EN_CT. The AND gate 513 is further coupled to receive an inversed detachment signal $/S_{DTC}$ at an output terminal of the inverter 515. The inverter 515 inverses the detachment signal $S_{DTC}$ from the PD detachment detection circuit 57 to generate the inversed detachment signal $/S_{DTC}$. The output terminal of the AND gate 513 is coupled to the reset input terminal RS of the counter 516 and generates a reset signal RST for resetting the counter 516 in response to the attachment signal $S_{ATC}$, the enabling signal EN_CT, and the inversed detachment signal $/S_{DTC}$. The counter 516 generates the enabling signal EN_BUS at its output terminal Q.

As shown in FIG. 5, when the level of the voltage $V_{TFM}$ is still lower than the level of the reference signal $V_{RT}$ for the counted time $T_{516}$, and the counter 516 has completed counting of the counted time $T_{516}$, the level of the enabling signal EN_BUS will become logic high (enabled). The PD detachment detection circuit 57 will confirms that the detachment of the portable device from the power converter by detecting the bus voltage $V_{BUS}$ in response to the enabling signal EN_BUS and generates the detachment signal $S_{DTC}$.

The PD detachment detection circuit 57 comprises a delay circuit 582, an inverter 583, an AND gate 585, a switch 571, a capacitor 572, an operational amplifier 573, and a comparator 574. The delay circuit 582 is coupled to the counter 516 to receive the enabling signal EN_BUS and delay the enabling signal EN_BUS with a delay time $T_{582}$ (as shown in FIG. 5) for generating a delay signal DLY. The first input terminal of the AND gate 585 is coupled to the counter 516 to receive the enabling signal EN_BUS. The second input terminal of the AND gate 585 is coupled to receive the delay signal DLY via the inverter 583. The AND gate 585 generates a sampling signal EN_SH at its output terminal. As shown in FIG. 5, the pulse width (on-time) of the sampling signal EN_SH is equals to the delay time $T_{582}$.

The switch 571 controlled by the sampling signal EN_SH is coupled between the capacitor 572 and the bus voltage terminal BUS of the detection circuit 50 for sampling the bus voltage $V_{BUS}$. The bus voltage terminal BUS of the detection circuit 50 is further connected to the bus power terminal VBUS. A sampled voltage $V_{SH}$ across the capacitor 572 is therefore generated to be equal to the bus voltage $V_{BUS}$ as the switch 571 turns on. The positive input terminal of the operational amplifier 573 is coupled to receive the sampled voltage $V_{SH}$. The negative input terminal and the output terminal of the operational amplifier 573 are coupled to each other to serve as a buffer.

Figure 6:
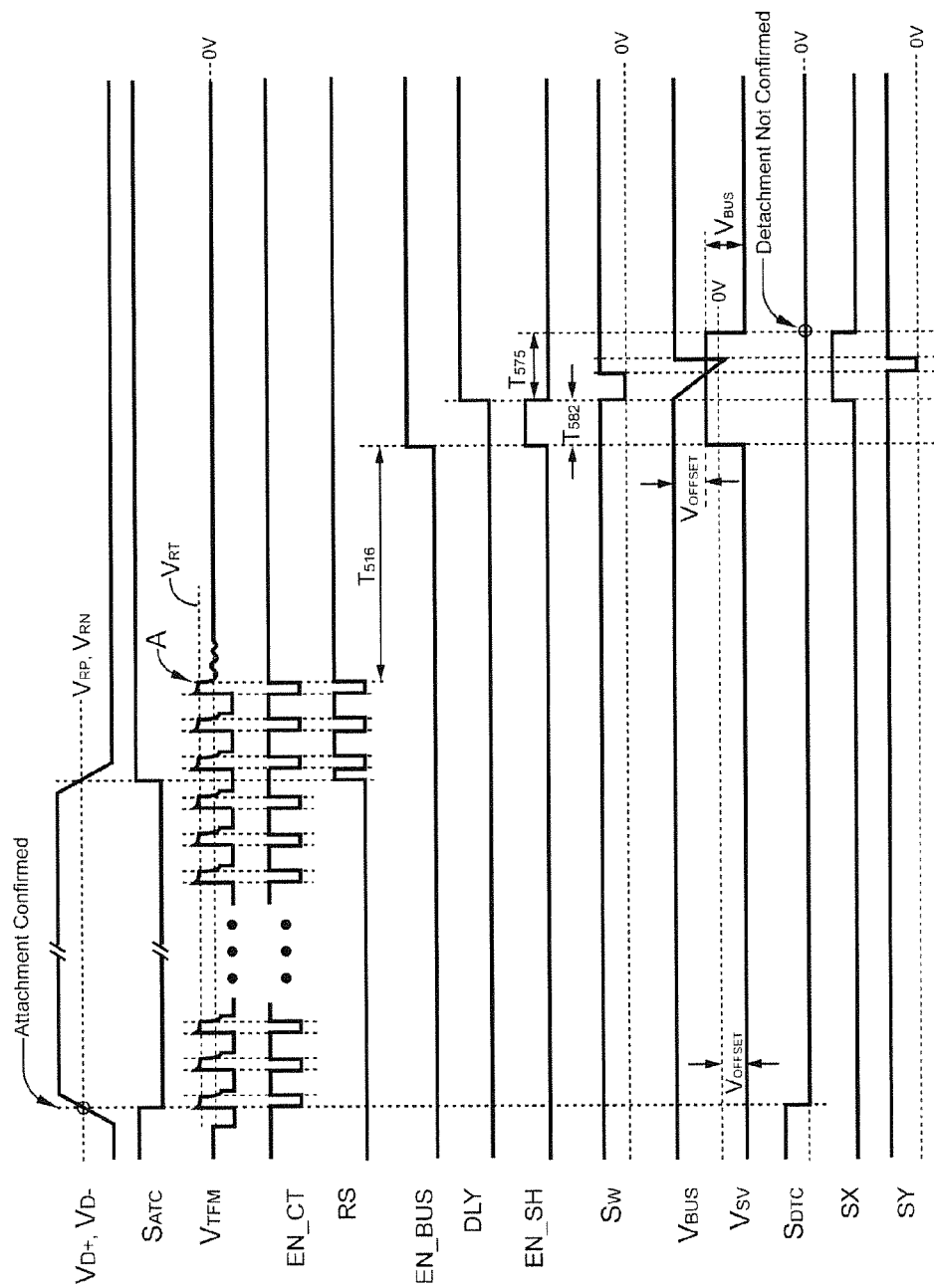
FIG. 6 is a timing diagram illustrating that the detachment of the portable device is not confirmed according to the present invention.

An offset voltage $V_{OFFSET}$ is coupled to the output terminal of the operational amplifier 573 for generating a voltage $V_{SV}$. As shown in FIG. 5, the voltage level of the voltage $V_{SV}$ is the difference level between the sampled voltage $V_{SH}$ (which equals to the bus voltage $V_{BUS}$) and the offset voltage $V_{OFFSET}$. The negative input terminal of the comparator 574 is coupled to receive the voltage $V_{SV}$, and the positive input terminal of the comparator 574 is coupled to the bus voltage terminal BUS, which is connected to the bus power terminal VBUS, to receive the bus voltage $V_{BUS}$. The comparator 574 generates a comparison output signal SY by comparing the voltage $V_{SV}$ and the bus voltage $V_{BUS}$. As shown in FIG. 5, the level of the comparison output signal SY is logic high when the level of the bus voltage $V_{BUS}$ is higher than the level of the voltage $V_{SV}$. As shown in FIG. 6, on the contrary, the level of the comparison output signal SY will become logic low when the level of the bus voltage $V_{BUS}$ is lower than the level of the voltage $V_{SV}$.

When the portable device is fully charged and then detached from the power converter, there will be no load at the bus power terminal VBUS and the voltage drop of the bus voltage $V_{BUS}$ is insignificant. As shown in FIG. 5, after the level of the sampling signal EN_SH becomes logic high (enabled) and the voltage $V_{SV}$ is generated, the level of the bus voltage $V_{BUS}$ is still higher than the level of the voltage $V_{SV}$, and the level of the comparison output signal SY will be logic high. That is, the detachment of the portable device from the power converter is confirmed. As shown in FIG. 6, on the contrary, after the level of the sampling signal EN_SH becomes logic high (enabled) and the voltage $V_{SV}$ is generated, the level of the bus voltage $V_{BUS}$ is lower than the level of the voltage $V_{SV}$, and the level of the comparison output signal SY will become logic low. That is, the detachment of the portable device from the power converter isn't confirmed.

Referring to FIG. 4, the PD detachment detection circuit 57 further comprises a delay circuit 575, inverters 577, 581, an AND gate 576, an OR gate 580, flip-flops 578, 579, and 586. The delay circuit 575 is coupled to the delay circuit 582 to receive the delay signal DLY and delay the delay signal DLY with a delay time $T_{575}$ (shown in FIG. 5). The first input terminal of the AND gate 576 is coupled to receive the output signal of the delay circuit 575 via the inverter 577. The second input terminal of the AND gate 576 is coupled to receive the delay signal DLY. The AND gate 576 generates a trigger signal SX. As shown in FIG. 5, the pulse width (on-time) of the trigger signal SX is determined by the delay time $T_{575}$.

The flip-flop 578 is triggered by the comparison output signal SY, and reset by the delay signal DLY. The data terminal D of the flip-flop 578 is supplied with a supply voltage $V_{CC}$. The first input terminal of the OR gate 580 is coupled to the output terminal Q of the flip-flop 578 to receive the output signal of the flip-flop 578. The second input terminal of the OR gate 580 is coupled to receive the delay signal DLY via the inverter 581. The OR gate 580 generates the switching signal $S_W$ at its output terminal. The gate driver 53 is coupled to the OR gate 580 to receive the switching signal $S_W$ for controlling the BUS switch 65 shown in FIG. 3A.

The switching signal $S_W$ is further utilized to reset the flip-flop 579. The flip-flop 579 is triggered by the trigger signal SX. The data terminal D of the flip-flop 579 is coupled to the comparator 574 to receive the comparison output signal SY. The output terminal Q of the flip-flop 579 is coupled to the flip-flop 586 to trigger the flip-flop 586. The data terminal D of the flip-flop 586 is supplied with the supply voltage $V_{CC}$. The flip-flop 586 generates the detachment signal $S_{DTC}$ at its output terminal Q for indicating whether the detachment of the portable device is confirmed or not. The flip-flop 586 is reset by the attachment signal $S_{ATC}$.

Both referring to FIG. 4 and FIG. 5, FIG. 5 is a timing diagram illustrating that the detachment of the portable device from the power converter is confirmed according to the present invention. As shown in FIG. 5, the attachment of the portable device to the power converter (charger) is confirmed by the PD attachment detection circuit 55a when the level of the voltage $V_{D-}$ or $V_{D+}$ is higher than the level of the reference signal $V_{RN}$ or $V_{RP}$. Therefore, the level of the attachment signal $S_{ATC}$ will become logic low.

After the portable device is detached, the levels of the voltages $V_{D-}$ and $V_{D+}$ are respectively lower than the levels of the reference signals $V_{RN}$ and $V_{RP}$, and therefore the level of the attachment signal $S_{ATC}$ will become logic high again.

In a definition by some PD manufacturers, especially which support adaptive charging function, the level of the voltages $V_{D-}$ and/or $V_{D+}$ will drop as the portable device is detached. Yet in another definition by other PD manufacturers, the level of the voltages $V_{D-}$ and/or $V_{D+}$ will drop automatically after a specific time following the rising edge of the voltages $V_{D-}$ and/or $V_{D+}$. No matter what scenario will be, the present invention provides the load detection circuit 51 to detect the load condition of the power converter for the next confirmation step (PD attachment or detachment with the power converter).

Referring to FIG. 5, at the time point A, the power converter enters burst switching operation. The next coming rising waveform of the voltage $V_{TFM}$ is postponed because the non-switching time (off-time) of the main switching signal $S_G$ prolongs for the purpose of power saving under light-load condition. Aforementioned burst switching operation could be resulted from the detachment of the PD or light-load condition caused by the portable device such as the fully charged battery level. During the non-switching time, the voltage $V_{TFM}$ of the transformer 10 will remain lower than the level of the reference signal $V_{RT}$. This will generate a logic-high (enabled) enabling signal EN_CT to activate the counting of the counter 516. Once the enabling signal EN_CT remains at logic-high for reaching a counted time $T_{516}$, the level of the enabling signal EN_BUS generated by the load detection circuit 51 will become logic high (enabled) to enable the PD detachment detection circuit 57 to start checking whether the portable device is detached from the power converter or not.

Following that, the level of the sampling signal EN_SH generated by the AND gate 585 will become logic high (enabled) to turn on the switch 571 to sample and hold (memorize) the bus voltage $V_{BUS}$ across the capacitor 572. The level of the voltage $V_{SV}$ will be equal to the difference voltage between the sampled voltage $V_{SH}$ (the bus voltage $V_{BUS}$) and the offset voltage $V_{OFFSET}$. The delay signal DLY will becomes logic-high after the time period $T_{582}$ following the rising edge of the enabling signal EN_BUS. The level of the switching signal $S_W$ will become logic low (disabled) to turn off the BUS switch 65 (as shown in FIG. 3A). Once the portable device has been detached, there will be no load at the bus power terminal VBUS, and the voltage drop of the bus voltage $V_{BUS}$ will be insignificant as the BUS switch 65 turns off. The level of the bus voltage $V_{BUS}$ will remain higher than the level of the voltage $V_{SV}$. This high-logic delay signal DLY will keep the trigger signal SX remaining at logic-high until the time period $T_{575}$ has elapsed. Once the level of the trigger signal SX becomes logic-low, the level of the detachment signal $S_{DTC}$ will become logic high, which indicates that the detachment of the portable device from the power converter is confirmed by the PD detachment detection circuit 57. Moreover, the level of the switching signal $S_W$ will become logic high (enabled) again to turn on the BUS switch 65 when the level of the delay signal DLY becomes logic low.

Both referring to FIG. 4 and FIG. 6, FIG. 6 is a timing diagram illustrating that the detachment of the portable device is no t confirmed according to the present invention. As shown in FIG. 6, once the sampling signal EN_SH becomes logic high, the bus voltage $V_{BUS}$ will be sampled and held across the capacitor 572. The level of the voltage $V_{SV}$ will be equal to the difference level of the sampled voltage $V_{SH}$ (which equals to the bus voltage $V_{BUS}$) and the offset voltage $V_{OFFSET}$. Whenever the delay signal DLY becomes logic high after the delay time $T_{582}$ following the rising edge of the sampling signal EN_SH, the switching signal $S_W$ will be disabled to turn off the BUS switch 65. The bus capacitor $C_{BUS}$ has relatively smaller capacitance than the output capacitor $C_O$. Once the level of the bus voltage $V_{BUS}$ significantly drops and becomes lower than the level of the voltage $V_{SV}$ during the time period $T_{575}$, this will indicate that the load is still being connected at the bus power terminal VBUS. At the same time, the comparison output signal SY is logic-low. This will enable the switching signal $S_W$ again to turn on the BUS switch 65 via the flip-flop 578 and the OR gate 580. Once the level of the trigger signal SX becomes logic-low, the level of the detachment signal $S_{DTC}$ is still logic low. Therefore the detachment of the portable device is not confirmed, which means that the portable device is still being attached to the power converter.

Figure 7:
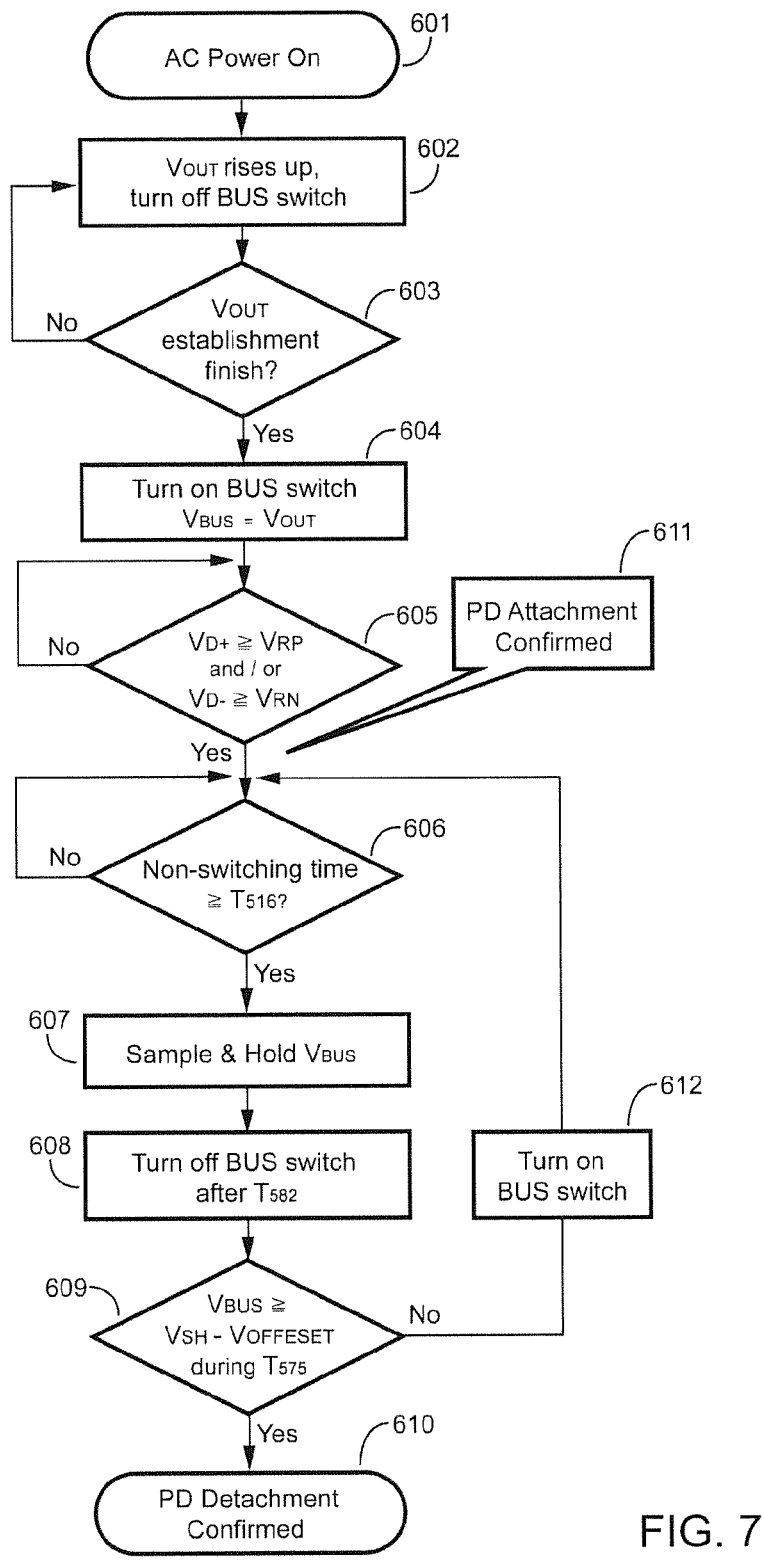
FIG. 7 is a flow chart of an embodiment of a detection method for confirming the attachment of the portable device to the power converter and the detachment of the portable device from the power converter according to the present invention.

FIG. 7 is a flow chart of an embodiment of a detection method for confirming the attachment of the portable device to the power converter and the detachment of the portable device from the power converter according to the present invention. The method starts as the AC power is turned on (step 601), which enables the power converter (charger) to be powered on. The output voltage $V_{OUT}$ (as shown in FIG. 3A) will rise up, and the BUS switch 65 (as shown in FIG. 3A) remains off before the output voltage $V_{OUT}$ is established (step 602 and 603). Once the establishment of the output voltage $V_{OUT}$ is finished, the BUS switch 65 will be turned on, and the bus voltage $V_{BUS}$ will be equal to the output voltage $V_{OUT}$ (step 604).

Next, the PD attachment detection circuit 55a (as shown in FIG. 3A) detects whether the level of the voltage $V_{D+}$ is higher than or equal to the level of the reference signal $V_{RP}$, and/or the level of the voltage $V_{D-}$ is higher than or equal to the level of the reference signal $V_{RN}$ (step 605). Once the level of the voltage $V_{D+}$ is higher than or equal to the level of the reference signal $V_{RP}$, and/or the level of the voltage $V_{D-}$ is higher than or equal to the level of the reference signal $V_{RN}$, the attachment of the portable device to the power converter will be confirmed (illustration block 611). If the attachment of the portable device to the power converter is not confirmed, the PD attachment detection circuit 55a will check whether the portable device is attached to the power converter again (step 605).

Next, the load detection circuit 51 checks whether the non-switching time of the transformer 10 is higher than or equal to the counted time $T_{516}$ (step 606). In this stage, the load detection circuit 51 checks whether the load condition of the power converter is light-load condition or not. In response to the attachment signal $S_{ATC}$, the load detection circuit 51 detects the load condition of the power converter by detecting the voltage of the voltage $V_{TFM}$ (the voltage of the transformer 10). In light-load condition, such as burst switching operation of the main switching signal $S_G$ (shown in FIG. 3A), the voltage of the voltage $V_{FFM}$ will be lower than the level of the reference signal $V_{RT}$ at least for a specific period time. The main switching signal $S_G$ includes a non-switching time (off-time). As the non-switching time of the main switching signal $S_G$ is lower than the counted time $T_{516}$, the load detection circuit 51 will repeatedly check the load condition of the power converter (step 606). Once the non-switching time of the transformer 10 is higher than or equal to the counted time $T_{516}$, this indicates that the load condition of the power converter becomes light-load condition, such as the portable device is fully charged. The PD detachment detection circuit 57 will sample and hold the bus voltage $V_{BUS}$ (step 607).

Next, the PD detachment detection circuit 57 turns off the BUS switch 65 after the delay time $T_{582}$ (step 608) which is the pulse width of the sampling signal EN_SH, as shown in FIG. 5. Next, the PD detachment detection circuit 57 checks whether the level of the bus voltage $V_{BUS}$ is higher than or equal to the difference level between the sampled voltage $V_{SH}$ and the offset voltage $V_{OFFSET}$ or not during the delay time $T_{575}$ shown in FIG. 5 (step 609). If the bus voltage $V_{BUS}$ is higher than or equal to the difference level, the detachment of the portable device from the power converter will be confirmed (step 610). On the contrary, the PD detachment detection circuit 57 will turn on the BUS switch 65 again (step 612). The flow will then go back to step 606 again for confirming the detachment of the portable device.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A circuit for detecting attachment and detachment between a portable device (PD) and a power converter configured to form an output voltage to deliver a bus voltage to the portable device, comprising:
    a PD attachment detection circuit configured to receive a signal from at least one connecting terminal of said power converter for confirming attachment of said portable device to said power converter and to generate an attachment signal in response to confirming attachment; and
    a PD detachment detection circuit configured to detect a light-load condition in response to the bus voltage changing from a first bus voltage to a second bus voltage that is less than the bus voltage, and to subsequently confirm detachment of said portable device from said power converter in response to detecting another change of the bus voltage during the light-load condition wherein the another change is no greater than a threshold value and wherein the threshold value is less than the second bus voltage.

2. The circuit as claimed in claim 1, wherein said at least one connecting terminal of said power converter is a data terminal.

3. The circuit as claimed in claim 1, wherein said at least one connecting terminal of said power converter is a current-sense terminal.

4. The circuit as claimed in claim 1, further comprising a load detection circuit configured to detect said light-load condition of said power converter in response to said attachment signal, and to responsively generate an enabling signal.

5. The circuit as claimed in claim 2, wherein said attachment of said portable device to said power converter is confirmed by said PD attachment detection circuit when an increase of said signal received at said data terminal is detected by said PD attachment detection circuit.

6. The circuit as claimed in claim 3, wherein said attachment of said portable device to said power converter is confirmed by recognizing a pattern current generated by a bus current drawn by said portable device via the bus voltage.

7. The circuit as claimed in claim 4, wherein said load detection circuit detects a voltage of a transformer of said power converter to detect said light-load condition of said power converter.

8. The circuit as claimed in claim 1, further comprising:
    a gate driver coupled to control a BUS switch which is coupled between an output capacitor and a bus capacitor of said power converter for generating said bus voltage across said bus capacitor.

9. The circuit as claimed in claim 8, wherein said PD detachment detection circuit is configured to assert an enabling signal in response to detecting the light-load condition, the PD detachment detection circuit configured to control said gate driver to turn off said BUS switch in response to said enabling signal, said PD detachment detection circuit configured to memorize said bus voltage before turning off said BUS switch, and monitors said voltage drop of said bus voltage after turning off said BUS switch for confirming said detachment of said portable device from said power converter.

10. The circuit as claimed in claim 9, wherein said PD detachment detection circuit is configured to turn off said BUS switch during the light-load condition of said power converter.

11. A method of forming a circuit for detecting attachment and detachment between a portable device (PD) and a power converter, comprising:
    configuring a first circuit to detect attachment of said portable device to said power converter and responsively generate an attachment signal;
    configuring a control circuit to detect a light-load condition of the power converter in response to a change in a bus voltage of said power converter including configuring the control circuit to receive a transformer voltage from a transformer of the power converter and detect the transformer voltage having a value less than a threshold value; and
    configuring the control circuit to subsequently detect another change of said bus voltage during the light-load condition to confirm detachment of the portable device and responsively assert a detachment signal.

12. The method as claimed in claim 11, wherein said attachment signal is generated in response to detecting a voltage at a data terminal of said power converter.

13. The method as claimed in claim 11, wherein the first circuit is configured to recognize a pattern current at a current-sense terminal of said power converter and responsively generate the attachment signal, wherein the pattern current is formed by current drawn by said portable device via the bus voltage.

14. The method as claimed in claim 12, wherein said attachment of said portable device to said power converter is confirmed in response to detecting an increase of said voltage at said data terminal.

15. The method as claimed in claim 11, further comprising:
    configuring the control circuit to detect the transformer voltage subsequently to receiving the attachment signal, for detecting said light-load condition of said power converter and responsively generating an enabling signal.

16. The method as claimed in claim 11, further comprising:
   configuring the control circuit to control a BUS switch which is configured to be coupled between an output of the transformer and a bus capacitor of said power converter to confirm detachment of the portable power device.

17. The method as claimed in claim 16, further comprising:
   configuring the control circuit to memorize said bus voltage before turning off said BUS switch; and
   configuring the control circuit to monitor said bus voltage after turning off said BUS switch to detect the another change of the bus voltage.

18. The method as claimed in claim 17, including configuring the control circuit to turn-off said BUS switch in response to said enabling signal indicating said light-load condition of said power converter.

19. The method of claim 11 wherein configuring the control circuit to subsequently detect the another change of the bus voltage includes configuring the control circuit to store the bus voltage as a stored value, open a bus switch that is coupled between a transformer of the power converter and the bus voltage, and detect the another change in response to a difference between the stored value and the bus voltage after opening the bus switch.

* * * * *